United States Patent
Kurosawa (10) Patent No.: US 10,086,655 B2
(45) Date of Patent: Oct. 2, 2018

(54) PNEUMATIC TIRE

(71) Applicant: Sumitomo Rubber Industries, Ltd., Kobe-shi, Hyogo (JP)

(72) Inventor: Hiroyuki Kurosawa, Kobe (JP)

(73) Assignee: SUMITOMO RUBBER INDUSTRIES LTD., Kobe-Shi, Hyogo (JP)

( * ) Notice: Subject to any disclaimer, the term of this patent is extended or adjusted under 35 U.S.C. 154(b) by 666 days.

(21) Appl. No.: 14/606,677

(22) Filed: Jan. 27, 2015

(65) Prior Publication Data

US 2015/0231930 A1 Aug. 20, 2015

(30) Foreign Application Priority Data

Feb. 18, 2014 (JP) .................. 2014-028773

(51) Int. Cl.
*B60C 11/12* (2006.01)

(52) U.S. Cl.
CPC ...... *B60C 11/1204* (2013.01); *B60C 11/1259* (2013.01); *B60C 2011/1213* (2013.01); *B60C 2011/1268* (2013.01)

(58) Field of Classification Search
CPC .................. B60C 11/0302; B60C 2011/0313
See application file for complete search history.

(56) References Cited

U.S. PATENT DOCUMENTS

| 6,571,844 | B1 * | 6/2003 | Ochi | ...................... | B60C 11/11 |
| | | | | | 152/209.18 |
| 7,832,439 | B2 * | 11/2010 | Ikeda | ...................... | B60C 11/01 |
| | | | | | 152/209.16 |
| 9,296,259 | B2 * | 3/2016 | Numata | .............. | B60C 11/0304 |
| 2006/0169377 | A1 * | 8/2006 | Hashimoto | ............. | B60C 11/12 |
| | | | | | 152/209.23 |
| 2008/0283167 | A1 | 11/2008 | Matsumura | | |
| 2011/0041973 | A1 * | 2/2011 | Numata | .............. | B60C 11/0306 |
| | | | | | 152/209.18 |

FOREIGN PATENT DOCUMENTS

| EP | 0088876 A2 * | 9/1983 | ............. B60C 11/12 |
| EP | 0088876 A2 * | 9/1983 | ............. B60C 11/12 |
| JP | 11189016 A * | 7/1999 | |
| JP | WO 2007088738 A1 * | 8/2007 | ............. B60C 11/11 |
| JP | 2008-279996 A | 11/2008 | |
| JP | 2011-42282 A | 3/2011 | |
| WO | WO-2007088738 A1 * | 8/2007 | ............. B60C 11/11 |

* cited by examiner

*Primary Examiner* — Joseph S Del Sole
*Assistant Examiner* — Cedrick S Williams
(74) *Attorney, Agent, or Firm* — Birch, Stewart, Kolasch & Birch, LLP (57) ABSTRACT

A pneumatic tire includes a tread portion with a designated rotational direction. The tread portion is provided with a shoulder main groove arranged nearby a tread edge, a plurality of shoulder lateral grooves each extending from the shoulder main groove to the tread edge to form a plurality of shoulder blocks. Each of the shoulder blocks includes a zigzag leading edge including an external corner with a first vertex formed between a long inclined side and a short inclined side. One of the shoulder blocks is provided with a plurality of shoulder sipes extending at an angle of 0 to 20 degrees with respect to an axial direction of the tire. One of the shoulder sipes includes a deep portion and a shallow portion that is arranged so as to include a position in the axial direction of the first vertex.

12 Claims, 5 Drawing Sheets

PNEUMATIC TIRE

BACKGROUND OF THE INVENTION

Field of the Invention

The present invention relates to a pneumatic tire, and in particular to a pneumatic tire that may exhibit an excellent driving performance on icy and snowy roads while improving chunking resistance of tread blocks.

Description of the Related Art

Typical winter tires (e.g. snow tires or studless tires) comprise a tread portion provided with a plurality of sipes to increase friction against the road in order to improve driving performance on icy and snowy roads. In addition, the tread portion may comprise a tread rubber having a low hardness which offers a large ground contacting area in order to further improve the driving performance on icy and snowy roads.

Unfortunately, since the conventional tread portion deforms so that stress concentrates on a bottom of sipes when coming into contact with the road. Thus, stress concentration on the bottom of the sipes may cause a crack or chunking in which a large piece of tread rubber breaks away.

SUMMARY OF THE INVENTION

The present invention has been worked out in light of the circumstances described above, and has a main object of providing a pneumatic tire that may exhibit an excellent driving performance on snowy and icy roads while improving chunking resistance of tread blocks.

According to one aspect of the present invention, there is provided a pneumatic tire including a tread portion having a designated rotational direction, the tread portion provided with a circumferentially and continuously extending shoulder main groove arranged proximate to a tread edge, a plurality of shoulder lateral grooves each extending from the shoulder main groove to the tread edge to form a shoulder block row comprising a plurality of shoulder blocks between the shoulder main groove and the tread edge. The shoulder blocks include a zigzag leading edge comprising an external corner having a first vertex formed between a long inclined side and a short inclined side. One of the shoulder blocks is provided with a plurality of shoulder sipes each extending at an angle of from 0 to 20 degrees with respect to an axial direction of the tire. At least one of the shoulder sipes includes a deep portion and a shallow portion. The shallow portion is arranged so as to include a position in the axial direction of the first vertex of the external corner of the zigzag leading edge.

In another aspect of the present invention, the zigzag leading edge may include an internal corner having a second vertex. The deep portion of the shoulder sipe may be arranged so as to include a position in the axial direction of the second vertex of the internal corner of the zigzag leading edge.

In another aspect of the present invention, the shallow portion may have a substantially constant depth and the deep portion may have a substantially constant depth.

In another aspect of the present invention, the leading edge may include a plurality of long inclined sides that have different lengths.

In another aspect of the present invention, the nearer to the tread edge, the longer the length of the long inclined side is.

In another aspect of the present invention, the shoulder sipes may extend in a wavy manner in the axial direction of the tire.

In another aspect of the present invention, the tread portion may include a tread rubber comprising a cap rubber layer to form a ground contacting surface of the tread portion, and the cap rubber layer may have hardness in a range of from 50 to 55 degrees.

DETAILED DESCRIPTION

An embodiment of the present invention will be explained below with reference to the accompanying drawings.

Figure 1:
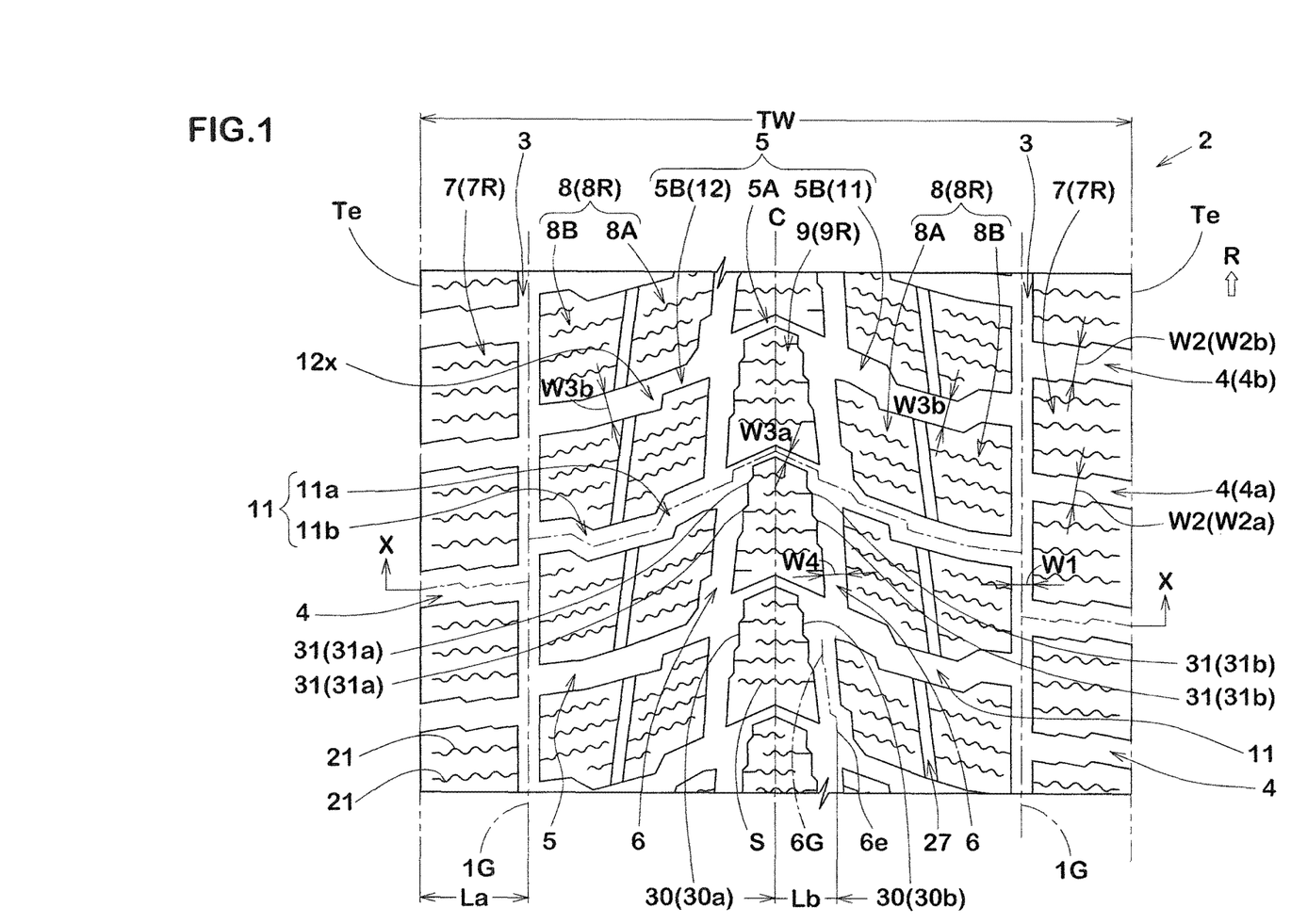
FIG. 1 is a development view of a tread portion of a pneumatic tire in accordance with an embodiment of the present invention.

As shown in FIG. 1, a pneumatic tire in accordance with the present embodiment may preferably be embodied as a winter tire that comprises a tread portion 2 with a pattern having a designated rotational direction R. In this embodiment, the pattern is configured to have a non symmetrical design with respect to the tire equator C. The rotational direction R may be indicated on a sidewall portion (not shown) of the tire using a mark or characters.

In this present embodiment, the tread portion 2, in each side of the tire equator C, is provided with a circumferentially and continuously extending shoulder main groove 3 arranged proximate to a tread edge Te, and a plurality of shoulder lateral grooves 4 each extending axially outwardly from the shoulder main groove 3 to the tread edge Te to form a shoulder block row 7R comprising a plurality of shoulder blocks 7 between the shoulder main groove 3 and the tread edge Te.

In this embodiment, the tread portion 2 is further provided with a plurality of main lateral grooves 5 extending from the tire equator C to both of the shoulder main grooves 3, and a pair of middle longitudinal grooves 6 extending between the adjacent main lateral grooves 5 and 5. Thus, the tread portion 2 further comprises a pair of middle block rows 8R and a center block row 9R. Each of the middle block rows 8R comprises a plurality of middle blocks 8 each of which is arranged between the shoulder main groove 3 and the middle longitudinal groove 6. The center block row 9R comprises a plurality of center blocks 9 each of which is arranged between the middle longitudinal grooves 6 and 6.

The tread edge Te is defined as an axially outer edge in a ground contact patch of the tread portion 2 in each side of the tire equator C under a standard loaded condition in which the tire 1 is mounted on a standard wheel rim with a standard pressure and is loaded with a standard tire load at a camber angle of set to zero.

In this application including specification and claims, various dimensions, positions and the like of the tire refer to those under a standard unloaded condition of the tire unless otherwise noted. The standard unloaded condition is such that the tire 1 is mounted on the standard wheel rim with the standard pressure and is loaded with no tire load. The axial distance between the tread edges Te and Te of the tire in the standard unloaded condition is defined as a tread width TW.

Here, the standard wheel rim is a wheel rim officially approved or recommended for the tire by standards organizations, i.e. JATMA, TRA, ETRTO, and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure and the standard tire load are the maximum air pressure and the maximum tire load for the tire specified by the same organization in the Air-pressure/Maximum-load Table or similar list. The standard pressure is the "maximum air pressure" in JATMA, the "Inflation Pressure" in ETRTO, and the maximum pressure given in the "Tire Load Limits at Various Cold Inflation Pressures" table in TRA or the like. In case of passenger car tires, however, the standard pressure is uniformly defined by 180 kPa.

The standard tire load is the "maximum load capacity" in JATMA, the "Load Capacity" in ETRTO, and the maximum value given in the above-mentioned table in IRA or the like. In case of passenger car tires, however, the standard tire load is uniformly defined by 88% of the maximum tire load.

Figure 2:
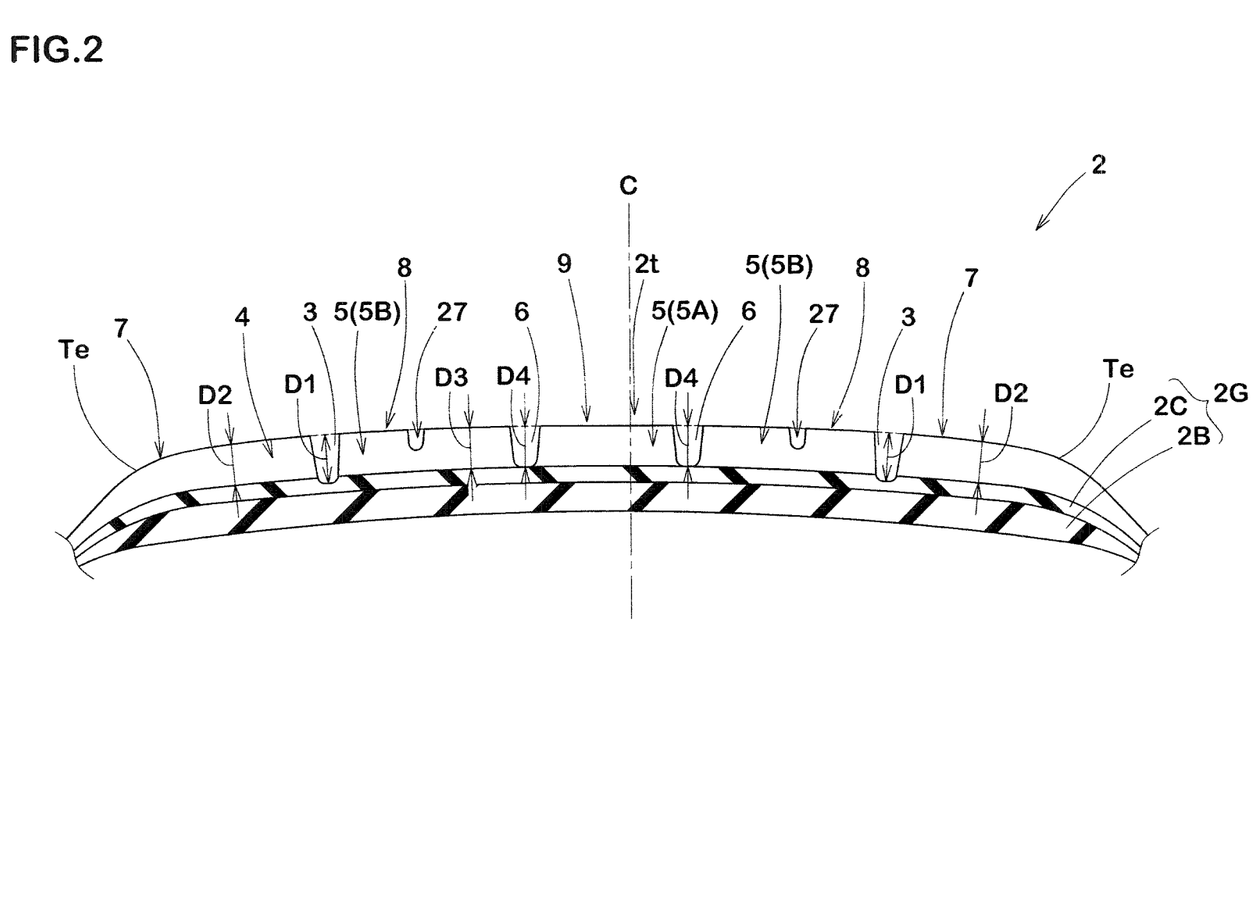
FIG. 2 is an enlarged cross sectional view taken along a line X-X of FIG. 1.

FIG. 2 illustrates a cross sectional view of the tread portion 2 taken along a line X-X of FIG. 1. As shown in FIG. 2, the tread portion 2 comprises a tread rubber 2G comprising a cap rubber layer 2C that includes a ground contacting surface 2t, and a base rubber layer 2B disposed radially inward of the cap rubber layer 2C.

Preferably, the cap rubber layer 2C has hardness in a range of from 50 to 55 degrees, more preferably in a range of from 51 to 54 degrees to offer a large ground contacting area which may increase friction against icy roads while improving stability on both of cornering and straight driving on dry roads. In order to further improve the advantage described above, the cap rubber layer 2C preferably has a thickness larger than a groove depth D1 of the shoulder main groove 3. In this specification, hardness of rubber is defined as a durometer type A under an environment of a temperature of 23 degrees Celsius based on JIS-K6253.

As shown in FIG. 1, the shoulder main groove 3 straightly extends along the circumferential direction of the tire. Such a shoulder main groove 3 may smoothly expel the water and snow backwardly, thereby improving driving performance on snowy roads.

Preferably, the shoulder main groove 3 has a groove width W1 in a range of from 1.5% to 4.5% of the tread width TW in order to further improve the advantage. Here, a groove width of any groove is measured perpendicular to its longitudinal direction. Preferably, the shoulder main groove 3 has the groove depth D1 (shown in FIG. 2) in a range of from 8.0 to 15.0 mm.

Preferably, the shoulder main groove 3 may be arranged in a certain axial position so that the steering stability of the tire can be improved by offering a large rigidity on the shoulder blocks 7. For instance, the groove centerline 1G of the shoulder main groove 3 may be arranged away from the tread edge Te at an axial distance La in a range of from 10.0% to 20.0% of the tread width TW.

Each of the shoulder lateral grooves 4 extends in a zigzag manner to increase the length of its circumferential edge component, thereby improving steering stability on icy roads. In this embodiment, the shoulder lateral grooves 4 include a first shoulder lateral grooves 4a having a groove width W2a, and a second shoulder lateral grooves 4b having a groove width W2b larger than the groove width W2a of the first shoulder lateral grooves 4a which are alternately arranged in the circumferential direction of the tire. These shoulder lateral grooves 4 may improve the driving performance of the tire on icy and snowy roads in a variety of conditions by slightly changing a ground contact pressure acted on the respective groove edges of the shoulder lateral grooves 4.

Preferably, a ratio W2b/W2a of the groove width W2b of the second shoulder lateral groove 4b to the groove width W2a of the first shoulder lateral groove 4a is in a range of from 1.20 to 1.25 in order to further improve the driving performance of the tire on icy and snowy roads.

Preferably, a groove width W2a of the first shoulder lateral grooves 4a is set in a range of from 6.0 to 12.0 mm.

Each of the main lateral grooves 5 includes a center portion 5A arranged in between the circumferentially adjacent center blocks 9, and a pair of middle portions 5B each arranged in between the circumferentially adjacent middle blocks 8 on each side the tire equator C.

The center portion 5A is configured to have a V-shape having a protruding top toward the rotational direction R of the tire on the tire equator C. Such a center portion 5A may smoothly expel the water and snow from under the tread portion 2 backwardly of the rotational direction R during traveling.

Preferably, the center portion 5A has a groove width W3a in a range of from 2.0 to 6.0 mm to increase pattern rigidity of a tread central region where a larger ground contact pressure is acted during traveling.

In each side of the tire equator C, the middle portion 5B includes a first middle portion 11 and a second middle portion 12 which are alternately arranged in the circumferential direction of the tire.

The first middle portion 11 extends from the middle longitudinal groove 6 to the shoulder main groove 3 backwardly of the rotational direction R as the whole while being bent. The first middle portion 11 includes a first bent portion 11a that bends backward of the rotational direction R and a second bent portion 11b that bends forward of the rotational direction R so that a crank-shaped backward projecting portion is formed. Such a first middle portion 11 may increase the length of the circumferential groove edge component to improve cornering performance of the tire.

The second middle portion 12 has a groove width W3b enlarging toward axially outward. The second middle portion 12 extends from the middle longitudinal groove 6 to the shoulder main groove 3 backwardly of the rotational direction R. Such a second middle portion 12 may smoothly expel the snow when cornering on snowy roads. Preferably, the groove width W3b is set in a range of from 5.0 to 10.0 mm to increase traction on snowy roads while improving the rigidity of the middle blocks 8.

Each of the middle longitudinal grooves 6 extend in the circumferential direction of the tire. Thus, the middle longitudinal grooves 6 may smoothly expel the snow backwardly of the rotational direction R from under the tread portion. Preferably, the middle longitudinal groove 6 has a groove width W4 in a range of from 5.0 to 10.0 mm.

Preferably, each of the middle longitudinal grooves 6 is located away from the tire equator C at an axial distance Lb in a range of from 5.0% to 12.0%. Thus, the axial rigidity of the respective center blocks 9 may balance with the axial rigidity of the respective middle blocks 8. The axial distance Lb is defined using the groove centerline 6G of the middle longitudinal groove 6. In case that the middle longitudinal groove 6 extends in a non-straight manner, e.g. zigzag manner, the distance Lb is defined as an axial distance between the trailing end 6e of the groove centerline 6G and the tire equator C.

As shown in FIG. 2, the groove depth D2 of the shoulder lateral grooves 4, the groove depth D3 of the main lateral groove 5, and the groove depth D4 of the middle longitudinal groove 6 are preferably in a range of from 80% to 100% of the groove depth D1 of the shoulder main groove 3 in order to further improve the snow traction while improving the rigidity of the respective blocks 7, 8 and 9.

Figure 3:
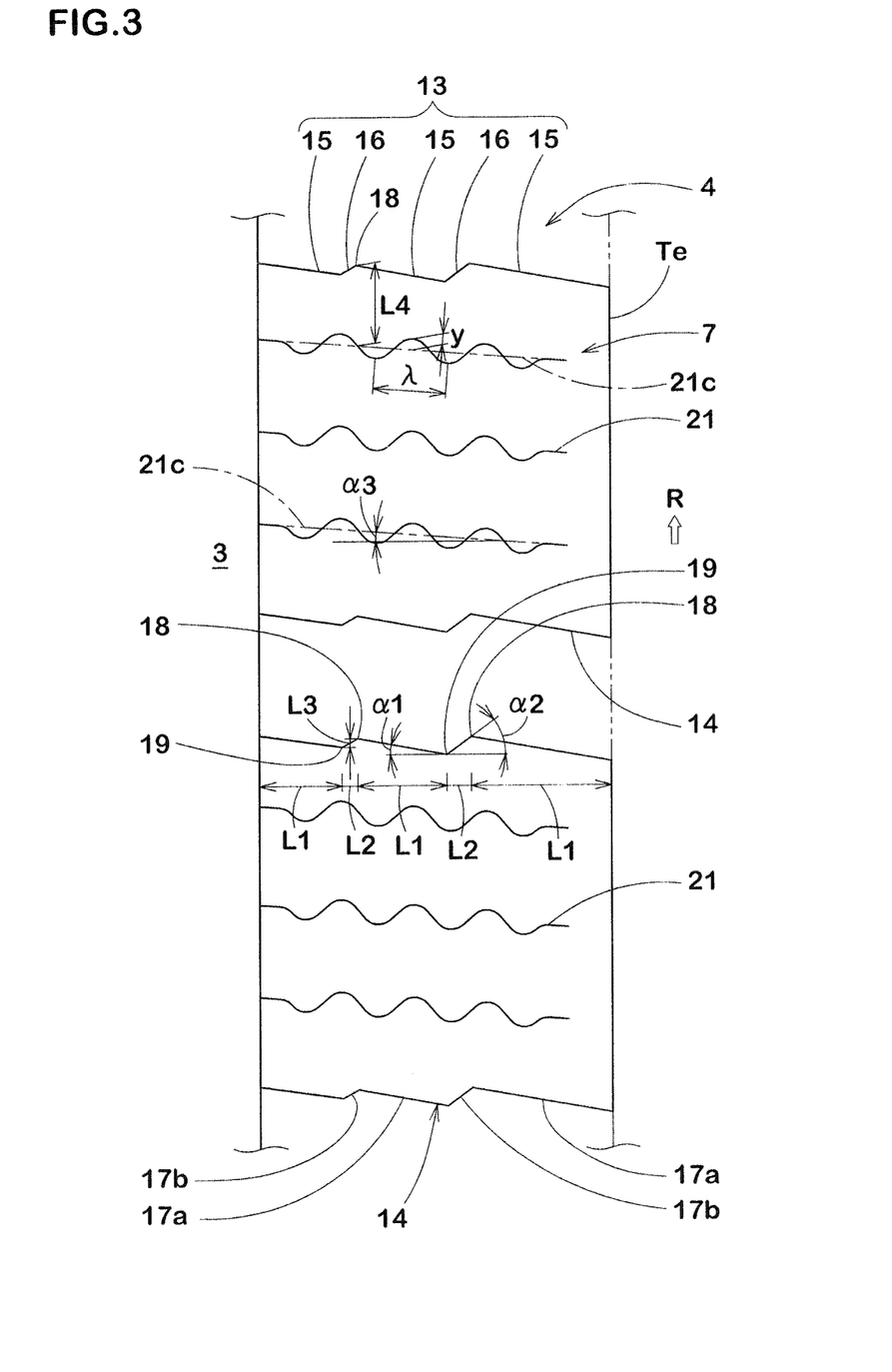
FIG. 3 is an enlarged view of a shoulder block of FIG. 1.

FIG. 3 illustrates a partial enlarged view of the right side shoulder block row of FIG. 1. As shown in FIG. 3, the shoulder block 7 includes a zigzag leading edge 13 and a trailing edge 14.

The zigzag leading edge 13 includes a long inclined side 15 and a short inclined side 16 having a length shorter than that of the long inclined side 15. These long inclined side 15 and short inclined side 16 are alternately arranged to form an external corner having a first vertex 18 and an internal corner having a second vertex 19. Such a leading edge 13 may increase a length of the circumferential edge component, thereby improving cornering, traction and braking performance on icy and snowy roads.

In this embodiment, the long inclined side 15 extends toward the tread edge Te while inclining backwardly. Such a long inclined side 15 may effectively scratch an icy road to generate a large friction force when cornering and may generate a large traction force on snowy roads.

Typically, the side force acted on the shoulder block 7 when cornering increases when approaching the tread edge Te. Accordingly, the leading edge 13 in accordance with the present embodiment may include a plurality of long inclined sides 15 having the respective different lengths which are longer than the axially inner one. Namely, the nearer to the tread edge Te, the longer the length of the long inclined side 15. Thus, the advantage described above may further be improved.

Preferably, a ratio L2/L1 of the axial length L2 of the short inclined side 16 to the axial length L1 of the long inclined side 15 is set in a range of not less than 0.15, more preferably not less than 0.20, but preferably not more than 0.40, more preferably not more than 0.35 to further improve the advantage described above while preventing chipping and uneven wear on shoulder blocks 7.

Preferably, the long inclined side 15 has an angle α1 in a range of not less than 5 degrees, more preferably not less than 7 degrees, but preferably not more than 15 degrees, more preferably not more than 13 degrees with respect to the axial direction of the tire to further improve the advantage described above.

Preferably, the short inclined side 16 has an angle α2 in a range of not less than 30 degrees, more preferably not less than 35 degrees, but preferably not more than 60 degrees, more preferably not more than 55 degrees with respect to the axial direction of the tire to further improve the driving performance on icy and snowy roads.

In this embodiment, a circumferential length L3 between the adjacent first vertex 18 and the second vertex 19 of the leading edge 13 is preferably set in a range of from 1.0 to 3.0 mm to increase the rigidity of the external corner while giving a long circumferential edge component on the leading edge 13.

The configuration of the trailing edge 14 is not particularly limited. In this embodiment, the trailing edge 14 has a zigzag shape that includes a long inclined side 17a and a short inclined side 17b having a length shorter than that of the long inclined side 17a in the same way as the leading edge 13. These long inclined side 17a and short inclined side 17b are alternately arranged to form a zigzag edge. Such a trailing edge 14 may also increase the length of the circumferential edge component, thereby improving cornering, traction and braking performance on icy and snowy roads.

Each of the shoulder blocks 7 is provided with a plurality of three in this embodiment, shoulder sipes 21 that extend at an angle in a range of from 0 to 20 degrees with respect to the axial direction of the tire. Since the shoulder sipes 21 provide a lot of lateral edge components on the shoulder blocks 7, the sipes 21 may increase traction and braking force on icy roads.

In this embodiment, the shoulder sipes 21 extend in a wavy manner. In another aspect of the embodiment, the shoulder sipes 21 may be formed as a straight or zigzag manlier. In case that each sipe 21 extends in a non straight manner having amplitude, the angle α3 of the sipe 21 is defined using its centerline 21c of the amplitude with respect to the axial direction of the tire.

In this embodiment, the shoulder sipe 21 is a semi-opened sipe that has one end opening at the shoulder main groove 3, and the other end located within the shoulder block 7 so as not to reach the tread edge Te. Such a semi-opened sipe may effectively scratch the road to increase friction against the road by preventing a large deformation of the shoulder block 7. In order to further improve the advantage described above, a circumferential length L4 between the centerline 21c of the shoulder sipe 21 arranged in the nearest side of the leading edge 13 and the first vertex 18 is preferably in a range of not less than 5.0 mm, more preferably not less than 6.0 mm, but preferably not more than 10.0 mm, more preferably not more than 9.0 mm.

Preferably, a wave length λ of the wavy configuration of the shoulder sipe 21 is in a range of from 3.0 to 5.0 mm in order to increase friction against the road while improving the rigidity of the shoulder blocks 7. In addition, an amplitude y of the sipe 21 with respect to its centerline 21c is in a range of from 0.5 to 1.5 mm.

Figure 4:
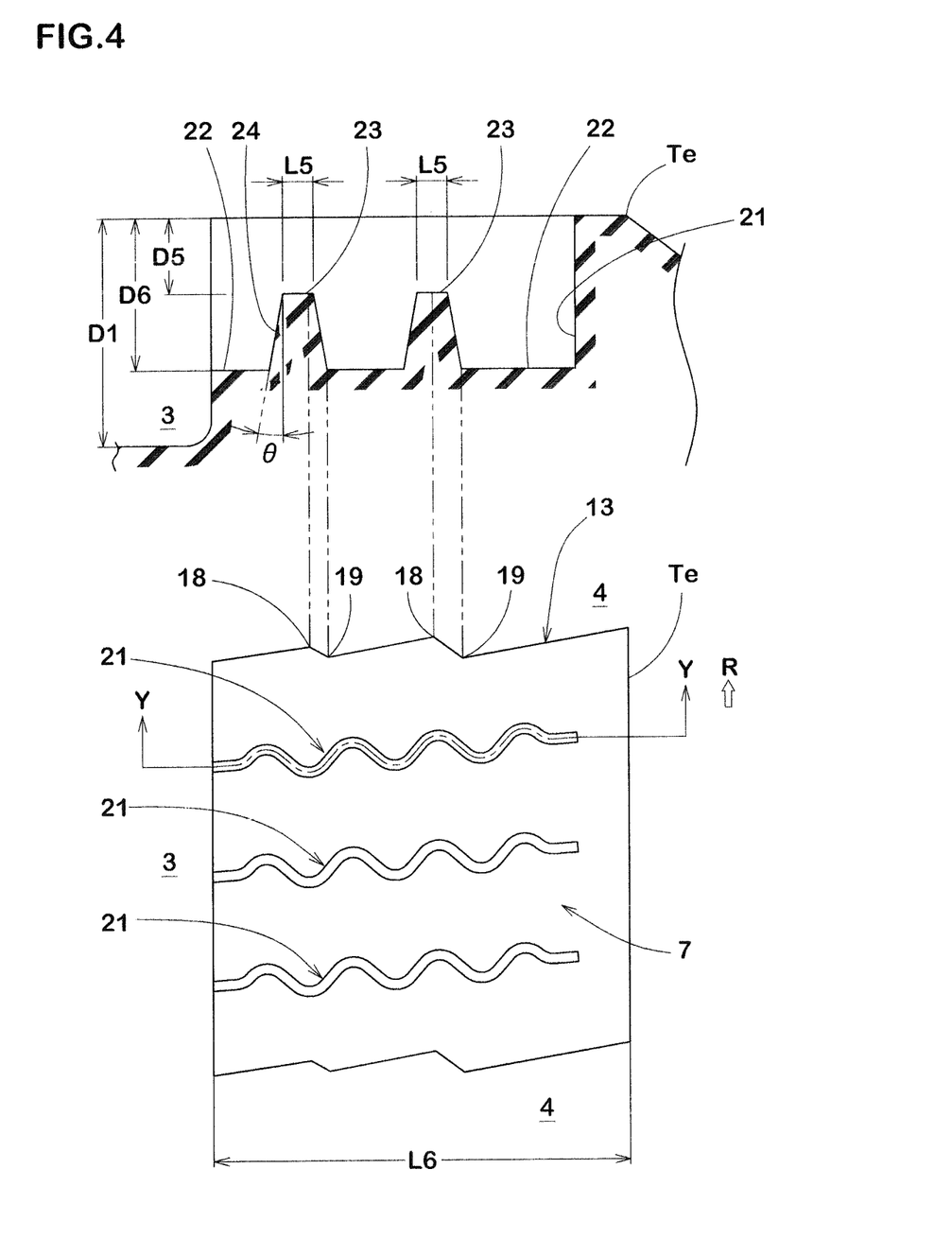
FIG. 4 is a plan view of the shoulder block of FIG. 1 and a cross sectional view taken along a line Y-Y thereof.

FIG. 4 illustrates a plan view of the shoulder block 7 and its cross sectional view taken along a line Y-Y which is correspondingly arranged upwardly of the plan view. As shown in FIG. 4, the shoulder sipe 21 includes a deep portion 22 and a shallow portion 23 that has a depth smaller than that of the deep portion 22. The shallow portion 23 is arranged so as to include a position in the axial direction of the first vertex 18 on the external corner of the leading edge 13. The portion of the shoulder sipe 21 where the shallow portion 23 is arranged may reduce the amount of deformation of the shoulder block 7 during traveling. Namely, the circumferential deformation of the shoulder block 7 caused by ground contacting force acted on the first vertex 18 having small rigidity may be reduced, thereby preventing the stress concentration on the bottom of the shoulder sipe 21. Thus, cracking and chunking on the shoulder block 7 can be prevented. Such a shoulder sipe 21 may further prevent a large opening on it due to the shallow portion 23 when grounding, thereby the leading edge 13 effectively coming into contact with the road to generate a large friction force and snow shearing force. Due to the above, the volume for shearing the snow of the shoulder lateral grooves 4 may be ensured during traveling, thereby increasing the snow traction to be generated there from.

In this embodiment, the deep portion 22 and the shallow portion 23 have the respective constant depth. Namely, the shallow portion 23 has the smallest depth D5 in the shoulder sipe 21, and the deep portion 22 has the deepest depth D6 in the shoulder sipe 21. Such a configuration of the shoulder sipe 21 may further improve the advantage above.

In this embodiment, the shoulder sipe 21 further includes a transitional portion 24 that extends between the shallow portion 23 and the deep portion while gradually changing its depth. The transitional portion 24 may be useful to reduce difference in rigidity between the shallow portion 23 and the deep portion 22 to further prevent the shoulder blocks 7 from cracking or chipping. Preferably, the transitional portion 24 can be inclined at an angle θ in a range of from 5 to 30 degrees with respect to the radial direction of the tire in a cross sectional view shown in FIG. 4.

During traveling, the second vertex 19 of the leading edge 13 may come into contact with the road later than the first vertex 18. Thus, less stress may act on the shoulder block 7 at the position in the axial direction of the second vertex 19. Accordingly, the deep portion 22 in accordance with the present embodiment is arranged so as to include a position in the axial direction of the second vertex 19 of the leading edge 13. This configuration may generate a large friction force against the road, thereby improving driving performance on icy and snowy roads.

Preferably, a depth ratio D5/D6 of the depth D5 of the shallow portion 23 to the depth D6 of the deep portion 22 is set in a range of not less than 0.55, more preferably not less than 0.60, but preferably not more than 0.75, more preferably not more than 0.70 in order to further improve the advantage above.

Preferably, the depth D6 (*mm*) of the deep portion 22 and the groove depth D1 (*mm*) of the shoulder main groove 3 satisfy the following relation:

(D1−1.6)×0.75≤D6≤(D1−1.6).

This configuration may further improve the shoulder block rigidity and the scratching effect of the shoulder sipe 21 in a well balanced manner.

Preferably, an axial length L5 of the respective shallow portions 23 is set in a range of not less than 5.0%, more preferably not less than 5.5%, but preferably not more than 10.0%, more preferably not more than 9.5% of the maximum axial width L6 of the shoulder block 7 in order to further improve the advantage described above.

As shown in FIG. 1, each of the middle blocks 8 is provided with a middle sub groove 27 that extending between the circumferential adjacent middle grooves 5B and 5B. Thus, the middle block 8 is divided into an axially inner portion 8A arranged between the middle sub groove 27 and the middle longitudinal groove 6 and an axially outer portion 8B arranged between the middle sub groove 27 and the shoulder main groove 3. The middle sub groove 27 may increase the length of the circumferential edge component which further improves the driving performance of the tire on icy and snowy roads.

In this embodiment, the middle sub groove 27 extends in a straight manner, thereby smoothly expelling the snow backwardly during driving from under the tread portion.

Each of the center blocks 9 in accordance with the present embodiment includes a pair of circumferential extending zigzag edges 30. The respective zigzag edges 30 include a plurality of external corners 31 that increase a length of the circumferential edge component of the groove, thereby improving the driving performance of the tire on icy and snowy roads.

The zigzag edges 30 include the left side zigzag edge 30a having external corners 31a and the right side zigzag edge 30b having external corners 31b. In this embodiment, the respective external corners 31b are arranged in the different positions with respect to the external corners 31a in the circumferential direction of the tire. In such a configuration, the respective external corners 31a and 31b may come into contact with the road alternately in a small circumferential interval, thereby further improving the driving performance on icy and snowy roads while enhancing the center block rigidity.

In this embodiment, both of the middle blocks 8 and the center blocks 9 are provided with a plurality of sipes S that extend at an angle of from 0 to 20 degrees with respect to the axial direction of the tire to improve the driving performance of the tire on icy and snowy roads.

In this embodiment, the tread portion 2 has a land ratio in a range of from 60% to 80% in order to further improve the driving performance of the tire on icy and snowy roads. Here, the land ratio refers to a ratio of a net ground contact area "Sb" to a gross ground contact area "Sa" that is obtained by plugging the whole grooves 3 to 6 and 27 on the tread portion 2.

While the particularly preferable embodiments of the pneumatic tire in accordance with the present invention have been described in detail, the present invention is not limited to the illustrated embodiments, but can be modified and carried out in various aspects.

Comparison Test:

Pneumatic tires having a size of 265/70R17 with a basic tread pattern shown in FIG. 1 were manufactured based on Table 1, and were tested with respect to these driving performance on icy and snowy roads, wear resistance and chunking resistance. The common specifications of tires are as follows.

Tread width TW: 196 mm
Tread cap rubber hardness: 52 degrees
Land ratio: 62%
Wave length λ of shoulder sipe: 4.0 mm
Amplitude y of shoulder sipe: 1.5 mm
Distance L4 between shoulder sipe and leading edge: 7.5 mm
Angle α1 of long inclined side of leading edge: 5 degrees
Depth D6 of deep portion: 9.0 mm
Groove width W1 of shoulder main groove: 6.8 mm
Groove depth D1 of shoulder main groove: 12.2 mm
Ratio La/TW of axial distance La to tread width TW: 0.15
Groove width W2a of first shoulder lateral groove: 10.2 mm
Groove width W2b of second shoulder lateral groove: 12.5 mm
Groove width W3a of center portion of main lateral groove: 3.0 to 4.2 mm
Groove width W3b of middle portion of main lateral groove: 7.0 to 8.8 mm
Groove width W4 of middle longitudinal groove: 6.5 to 8.8 mm
Groove depth D2 of shoulder lateral groove D2: 11.6 mm
Groove depths D3 and D4 of main lateral groove and middle longitudinal groove respectively: 10.0 to 12.2 mm Test methods are as follows.

Driving Performance on Icy and Snowy Roads Test:

Each test tire was installed to a four-wheel drive vehicle having a displacement of 4,000 cc on its all wheels under the following condition, and then a professional driver drove the vehicle on a hardened snow road and an icy road to check its steering response, rigidity feeling and grip by his feeling. The test results are shown using an average score of both roads. The score has ten grades, wherein Ref. 1 is defined as the fourth grade. The larger the score, the better the performance is.

Rim size: 7.5
Air pressure: 220 kPa
Tire load: 5.8 kN

Uneven Wear Resistance Test:

The test vehicle described above was run a distance of 8,000 km on a dry asphalt road, and then the difference of amount of wear between the leading edge and the trailing edge of the shoulder block at its axial center position was measured. The test results were evaluated a reciprocal of the difference using an index, wherein the Ref. 1 is ten. The larger the value, the better the performance is.

Chunking Resistance Test:

After the uneven wear resistance test, the number of chunking including a crack on the shoulder ripe was counted. The test results were evaluated a reciprocal of the number of chunking, wherein the Ref. 1 is 100. The larger the value, the better the performance is.

The test results are shown in Table 1. From the test results, it was confirmed that the examples in accordance with the present invention improved the driving performance on icy and snowy roads, uneven wear resistance and chunking resistance compared to the references.

TABLE 1

Figure 5:
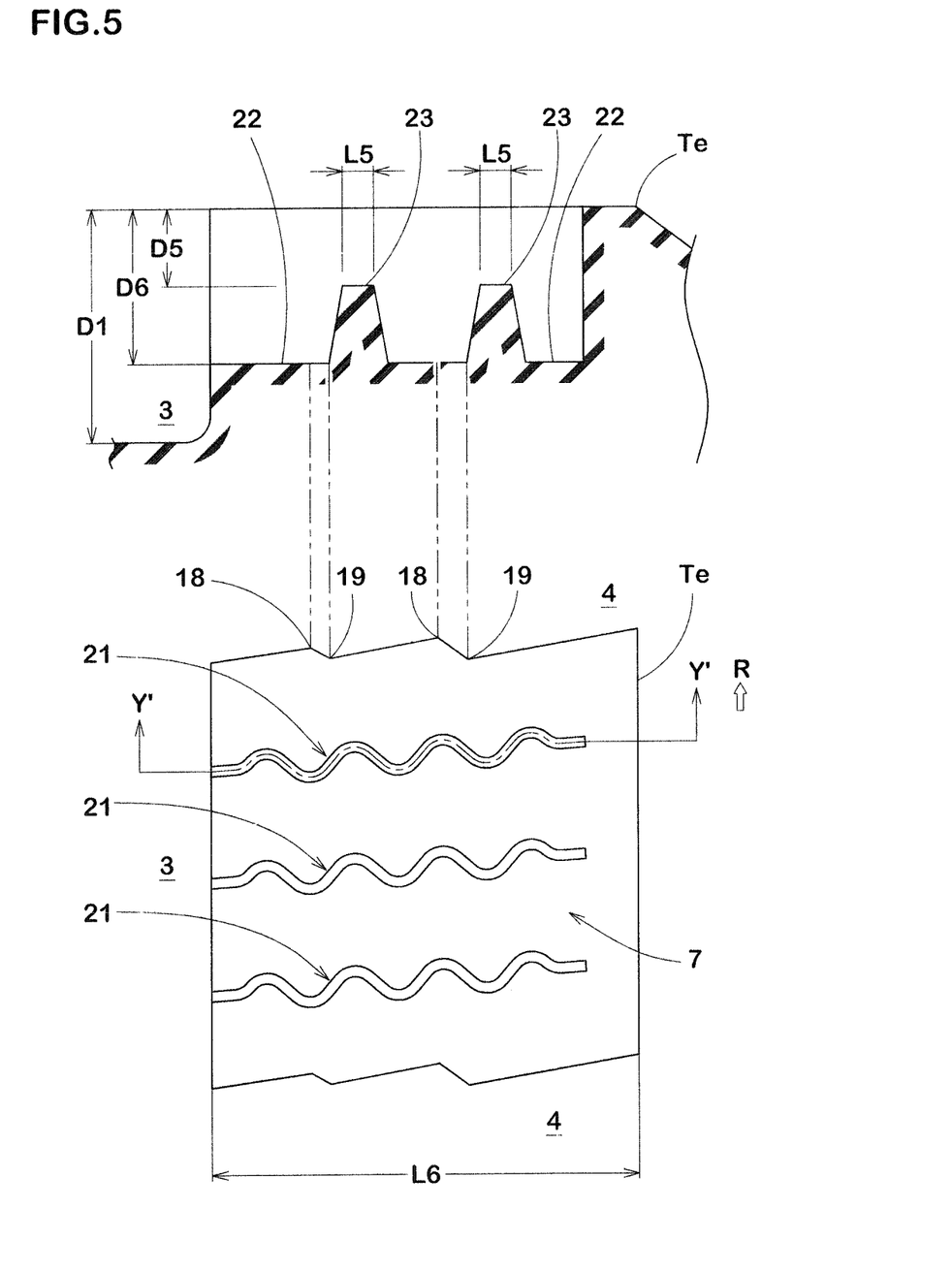
FIG. 5 is a plan view of a shoulder block of a reference 1 and a cross sectional view taken along a line Y'-Y' thereof.

| | Ref. 1 | Ex. 1 | Ex. 2 | Ref. 2 | Ref. 3 | Ex. 3 | Ex. 4 | Ex. 5 | Ex. 6 | Ref. 4 | Ex. 7 |
|---|---|---|---|---|---|---|---|---|---|---|---|
| Shoulder block configuration | FIG. 5 | FIG. 4 | FIG. 4 | FIG. 4 | FIG. 4 | FIG. 4 | FIG. 4 | FIG. 4 | FIG. 4 | FIG. 4 | FIG. 4 |
| Shoulder sipe angle α3 (deg.) | 10 | 10 | 20 | 22 | 10 | 10 | 10 | 10 | 10 | 10 | 10 |
| Ratio D5/D6 | 0.65 | 0.65 | 0.65 | 0.65 | 1 | 0.5 | 0.55 | 0.75 | 0.8 | 0.65 | 0.65 |
| Ratio L2/L1 | 0.25 | 0.25 | 0.25 | 0.25 | 0.25 | 0.25 | 0.25 | 0.25 | 0.25 | 1 | 0.1 |
| Circumferential length L3 between first and second vertexes (mm) | 2 | 2 | 2 | 2 | 2 | 2 | 2 | 2 | 2 | 2 | 2 |
| Ratio L5/L6 | 7.5 | 7.5 | 7.5 | 7.5 | 7.5 | 7.5 | 7.5 | 7.5 | 7.5 | 7.5 | 7.5 |
| Driving performance on icy and snowy roads [Score] | 6 | 6 | 5 | 4 | 8 | 4 | 5 | 7 | 7 | 4 | 4 |
| Uneven wear resistance [Index] | 10 | 10 | 12 | 12 | 6 | 10 | 10 | 9 | 8 | 10 | 7 |
| Chunking resistance [Index] | 100 | 150 | 140 | 125 | 90 | 155 | 155 | 145 | 140 | 150 | 150 |

| | Ex. 8 | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|
| Shoulder block configuration | FIG. 4 | FIG. 4 | FIG. 4 | FIG. 4 | FIG. 4 | FIG. 4 | FIG. 4 | FIG. 4 | FIG. 4 | FIG. 4 | FIG. 4 |
| Shoulder sipe angle α3 (deg.) | 10 | 10 | 10 | 10 | 10 | 10 | 10 | 10 | 10 | 10 | 10 |
| Ratio D5/D6 | 0.65 | 0.65 | 0.65 | 0.65 | 0.65 | 0.65 | 0.65 | 0.65 | 0.65 | 0.65 | 0.65 |
| Ratio L2/L1 | 0.15 | 0.4 | 0.45 | 0.25 | 0.25 | 0.25 | 0.25 | 0.25 | 0.25 | 0.25 | 0.25 |
| Circumferential length L3 between first and second vertexes (mm) | 2 | 2 | 2 | 0.5 | 1 | 3 | 3.5 | 2 | 2 | 2 | 2 |
| Ratio L5/L6 | 7.5 | 7.5 | 7.5 | 7.5 | 7.5 | 7.5 | 7.5 | 4.5 | 5 | 10 | 10.5 |
| Driving performance on icy and snowy roads [Score] | 6 | 6 | 5 | 4 | 5 | 6 | 7 | 6 | 6 | 5 | 4 |
| Uneven wear resistance [Index] | 9 | 10 | 10 | 12 | 11 | 10 | 9 | 9 | 10 | 11 | 11 |
| Chunking resistance [Index] | 150 | 140 | 140 | 140 | 150 | 150 | 140 | 145 | 150 | 150 | 155 |

What is claimed is:

1. A pneumatic tire comprising:
a tread portion having a designated rotational direction, the tread portion provided with a circumferentially and continuously extending shoulder main groove arranged proximate to a tread edge, a plurality of shoulder lateral grooves each extending from the shoulder main groove to the tread edge to form a shoulder block row comprising a plurality of shoulder blocks between the shoulder main groove and the tread edge;
the shoulder blocks comprising a zigzag leading edge comprising an external corner having a first vertex formed between a long inclined side and a short inclined side, one of the shoulder blocks being provided with a plurality of shoulder sipes each extending at an angle of from 0 to 20 degrees with respect to an axial direction of the tire; and
at least one of the shoulder sipes comprising a deep portion and a shallow portion, the shallow portion arranged so as to include a position in the axial direction of the first vertex of the external corner of the zigzag leading edge;
wherein the zigzag leading edge comprises a plurality of external corners having a plurality of the first vertexes, the at least one of the shoulder sipes comprises a plurality of shallow portions, and each of the shallow portions is arranged so as to include a position in the axial direction of each of the first vertexes of each of the external corners of the zigzag leading edge.

2. The pneumatic tire according to claim 1, wherein the zigzag leading edge comprises an internal corner having a second vertex, and wherein the deep portion of the shoulder ripe is arranged so as to include a position in the axial direction of the second vertex of the internal corner of the zigzag leading edge.

3. The pneumatic tire according to claim 1, wherein the shallow portion has a substantially constant depth and wherein the deep portion has a substantially constant depth.

4. The pneumatic tire according to claim 1, wherein the leading edge comprises a plurality of long inclined sides that have different lengths.

5. The pneumatic tire according to claim 4, wherein the nearer to the tread edge, the longer the length of the long inclined side is.

6. The pneumatic tire according to claim 1, wherein the shoulder sipes extends in a wavy manner in the axial direction of the tire.

7. The pneumatic tire according to claim 1, wherein the tread portion comprises a tread rubber comprising a cap rubber layer to form a ground contacting surface of the tread portion, and wherein the cap rubber layer has hardness in a range of from 50 to 55 degrees.

8. The pneumatic tire according to claim 1, wherein the zigzag leading edge comprises a plurality of internal corners having a plurality of the second vertexes, the at least one of the shoulder sipes comprises a plurality of deep portions, and each of the deep portions is arranged so as to include a position in the axial direction of each of the second vertexes of each of the internal corners of the zigzag leading edge.

9. The pneumatic tire according to claim 1, wherein the zigzag leading edge comprises a plurality of short inclined sides that have different lengths, and wherein the nearer to the tread edge, the longer the length of the short inclined side is.

10. The pneumatic tire according to claim 5, wherein the zigzag leading edge comprises a plurality of short inclined sides that have different lengths, and wherein the nearer to the tread edge, the longer the length of the short inclined side is.

11. The pneumatic tire according to claim 1, wherein the first vertex of the external corner of the zigzag leading edge is located in the axial direction at a substantially middle position of the shallow portion.

12. The pneumatic tire according to claim 8, wherein the fisrt vertex of the external corner of the zigzag leading edge is located in the axial direction at a substantially middle position of the shallow portion.

\* \* \* \* \*